UNITED STATES PATENT OFFICE.

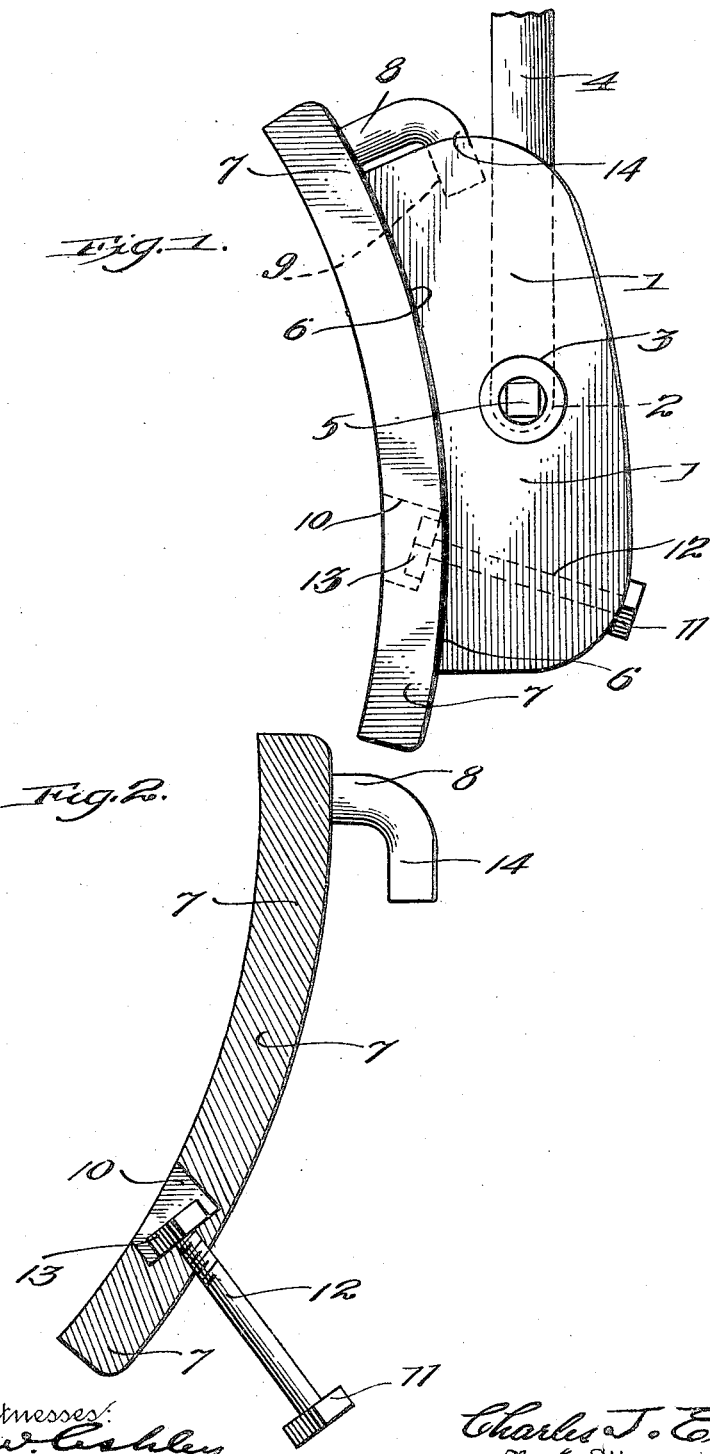

CHARLES J. EGLER, OF NEW YORK, N. Y.

BRAKE-SHOE.

No. 875,249.   Specification of Letters Patent.   Patented Dec. 31, 1907.

Application filed May 13, 1907. Serial No. 373,342.

*To all whom it may concern:*

Be it known that I, CHARLES J. EGLER, a citizen of the United States, residing at New York city, in the county of New York and State of New York, have invented certain new and useful Improvements in Brake-Shoes, of which the following is a specification.

The invention relates to improvements in brake shoes having particular reference to a device that may be readily applied to brake shoe blocks without the necessity of removing the wheel or adjusting the parts included in the brake actuating mechanism.

In the following is described in connection with the accompanying drawings one embodiment of the invention, the features thereof being more particularly pointed out hereinafter in the claims.

In the drawings Figure 1 is a side elevation of the device showing the manner in which the brake shoe is applied to a brake block, and Fig. 2 is a vertical sectional view of the brake shoe and illustrates in connection therewith means for holding said shoe to the brake block.

Similar numerals of reference indicate similar parts throughout the several views.

1 indicates a block provided with hole 2 adapted to receive the cross-head 3 of the brake rod mechanism 4. Said cross-head 3 is fastened into brake block 1 by means of bolt 5. Brake block 1 is constructed in the usual form and is made of the ordinary material useful or applicable to devices of the nature as herein described, and has formed thereon reception surface 6 adapted to receive brake shoe 7.

Brake shoe 7, as illustrated in Fig. 1 of the drawings, is formed of metal applicable to the purposes for which a brake shoe is used. Said brake shoe 7 fits snugly within the reception surface 6 of block 1 at its engaging portions and is so mounted on said block 1 that its respective ends project beyond the ends of the brake block to a considerable extent. The part projecting above the upper portion of brake block 1 has preferably cast therewith an angularly bent hook 8 adapted to engage a hole or socket 9 formed on the top of brake block 1. Brake shoe 7 has formed therein at an intermediate portion thereof a diagonally formed hole or socket 10 countersunk in the metallic face portion of said brake shoe 7 to approximately two-thirds of the thickness of said brake shoe.

11 indicates a bolt mounted diagonally in brake block 1. The shank portion 12 thereof projects upwardly into socket 9 of the brake shoe 7 and is adapted to receive at that point a tightening head or nut 13.

Hook 8, described as being angularly bent, consists of the shank portion 12 and the diagonally extending or engaging head 14, said engaging head 14 contacting with the hole or socket 9 described as being cut in the top portion of brake block 1.

The device as illustrated in the accompanying drawings shows the invention as applied or mounted on the well known brake manipulating rod which is in turn associated with an ordinary brake actuating mechanism. It is well to note that in applying the invention, or the brake shoe proper, to a brake block forming part of the brake mechanism associated with any type of vehicle, that the same may be attached or detached in a very short space of time thus obviating all the difficulties met with in applying or detaching similar devices.

It is obvious that when the brake shoe is mounted on a brake block, and when the same is brought into contact with a vehicle wheel, that the bolt 12 will prevent said brake shoe 7 from slipping longitudinally of the brake block 1 and also receive all of the strain caused by the binding and centrifugal force of said vehicle wheel when the brake shoe is brought into contact therewith. Hook 8 provides means for holding the brake shoe to the brake block and also supporting means for the same when the brake is not in contact with a vehicle wheel. It is also obvious that a device of the nature herein set forth may be manufactured at a small expense, and when a shoe, after having been used in connection with a vehicle for some time, is worn to a considerable extent, that it may be discarded and readily replaced by a new one. It is further obvious that the device may be widely varied without departing from the spirit of the invention.

What I claim and desire to secure by Letters Patent of the United States is:—

1. A device of the character described including a brake block, a support therefor, a brake shoe, a hook formed on said brake shoe, a socket formed in said brake block adapted to receive said hook, and a reception socket formed in said brake shoe adapted to receive a diagonally mounted bolt carried by said brake block.

2. A device of the character described including a brake shoe having formed on its upper end an engaging hook adapted to engage a reception socket in a brake block, and at an intermediate portion thereof a reception socket adapted to receive a diagonally mounted bolt carried by said brake block.

In testimony whereof I have hereunto signed my name in the presence of two subscribing witnesses.

CHARLES J. EGLER.

Witnesses:
    FRED. EGLER,
    CHARLES GREENHAZEN.